US012602185B2

(12) United States Patent
Vines et al.

(10) Patent No.:  US 12,602,185 B2
(45) Date of Patent:  *Apr. 14, 2026

(54) MAINTAINING SYNCHRONISATION BETWEEN MEMORY WRITING AND READING BLOCKS USING AN INTERNAL BUFFER AND A CONTROL CHANNEL

(71) Applicant: Imagination Technologies Limited, Kings Langley (GB)

(72) Inventors: Alan Vines, Hertfordshire (GB); Stephen Spain, Hertfordshire (GB); Fernando Escobar, Hertfordshire (GB)

(73) Assignee: Imagination Technologies Limited, Kings Langley (GB)

( * ) Notice: Subject to any disclaimer, the term of this patent is extended or adjusted under 35 U.S.C. 154(b) by 0 days.

This patent is subject to a terminal disclaimer.

(21) Appl. No.: 18/376,094

(22) Filed: Oct. 3, 2023

(65) Prior Publication Data

US 2024/0028256 A1      Jan. 25, 2024

Related U.S. Application Data

(63) Continuation of application No. 17/336,701, filed on Jun. 2, 2021, now Pat. No. 11,775,206.

(30) Foreign Application Priority Data

Jun. 2, 2020      (GB) ...................................... 2008299
Aug. 17, 2020      (GB) ...................................... 2012814

(51) Int. Cl.
*G06F 3/06*      (2006.01)
(52) U.S. Cl.
CPC ............ *G06F 3/0656* (2013.01); *G06F 3/061* (2013.01); *G06F 3/0679* (2013.01)

(58) Field of Classification Search
CPC ...... G06F 3/0656; G06F 3/061; G06F 3/0679; G06F 3/064
(Continued)

(56) References Cited

U.S. PATENT DOCUMENTS 2,891,883 A      6/1959  Howe
3,918,297 A      11/1975  Rocha
(Continued)

OTHER PUBLICATIONS

William Gropp, Lecture 7: Matrix Transpose, Nov. 23, 2018 (Year: 2018).*
(Continued)

*Primary Examiner* — Than Nguyen
(74) *Attorney, Agent, or Firm* — Potomac Law Group, PLLC; Vincent M DeLuca

(57) ABSTRACT

A hardware unit for manipulating data stored in a memory comprises an internal buffer, a memory reading block, configured to read the data from the memory and write the data to the internal buffer. a memory writing block, configured to read the data from the internal buffer and write the data to the memory. The hardware unit optionally also comprises a control channel between the memory reading block and the memory writing block, wherein the memory reading block and the memory writing block are configured to communicate via the control channel to maintain synchronisation between them when writing the data to the internal buffer and reading the data from the internal buffer, respectively. The hardware unit may be configured to apply one or more transformations to multidimensional data in the memory. The hardware unit may be configured to traverse the multidimensional array using a plurality of nested loops.

17 Claims, 8 Drawing Sheets

(58) Field of Classification Search
USPC ......................................................... 711/154
See application file for complete search history.

(56) References Cited

U.S. PATENT DOCUMENTS

| | | | |
|---|---|---|---|
| 4,237,551 A | 12/1980 | Narasimha | |
| 5,148,547 A | 9/1992 | Kahle et al. | |
| 5,557,734 A | 9/1996 | Wilson | |
| 5,659,781 A | 8/1997 | Larson | |
| 5,938,763 A | 8/1999 | Fimoff et al. | |
| 5,960,468 A | 9/1999 | Paluch | |
| 5,963,531 A | 10/1999 | Takahashi | |
| 6,105,114 A | 8/2000 | Okuno | |
| 7,428,628 B2 | 9/2008 | Fenney | |
| 8,095,745 B1* | 1/2012 | Schmidt | G06F 12/0207 |
| | | | 711/154 |
| 8,825,730 B1 | 9/2014 | Perry et al. | |
| 9,330,740 B1* | 5/2016 | Baeckler | G11C 7/222 |
| 11,431,392 B2 | 8/2022 | Wang et al. | |
| 2005/0223178 A1* | 10/2005 | Garcia | G06F 11/3404 |
| | | | 711/151 |
| 2006/0031652 A1 | 2/2006 | Richter et al. | |
| 2006/0082585 A1 | 4/2006 | Yeo | |
| 2006/0248489 A1 | 11/2006 | Ruf | |
| 2008/0098208 A1* | 4/2008 | Reid | G06F 11/3636 |
| | | | 712/234 |
| 2008/0244332 A1* | 10/2008 | Edwards | G06F 11/3612 |
| | | | 714/48 |
| 2009/0133033 A1* | 5/2009 | Lindo | G06F 11/0778 |
| | | | 718/108 |
| 2014/0068168 A1 | 3/2014 | Murrin et al. | |
| 2016/0124889 A1 | 5/2016 | Singh et al. | |
| 2017/0169034 A1 | 6/2017 | Shrivastava et al. | |
| 2018/0255307 A1 | 9/2018 | Douady-Pleven et al. | |
| 2018/0300602 A1 | 10/2018 | Petre et al. | |
| 2019/0042221 A1 | 2/2019 | Krishnaiyer et al. | |
| 2019/0104322 A1 | 4/2019 | Tsukuba | |
| 2019/0196995 A1 | 6/2019 | Shen et al. | |
| 2019/0340014 A1 | 11/2019 | Fishel et al. | |
| 2019/0377580 A1 | 12/2019 | Vorbach et al. | |
| 2020/0019380 A1 | 1/2020 | Ross et al. | |
| 2020/0133854 A1* | 4/2020 | Yang | G06F 17/16 |
| 2020/0202198 A1* | 6/2020 | Lee | G06N 3/08 |
| 2021/0048992 A1 | 2/2021 | Dally | |
| 2022/0253683 A1 | 8/2022 | Asad et al. | |

OTHER PUBLICATIONS

Gropp, Lecture 7: Matrix Transpose, Nov. 23, 2018 (Year: 2018) (note: copy in parent application).

* cited by examiner

310

READ DATA FROM EXTERNAL MEMORY

325

INCREMENT LOOP INDEX AND SYNCHRONISATION COUNTER

SET OF NESTED LOOPS

WRITE DATA TO INTERNAL BUFFER

320

COMPARE SYNCHRONISATION COUNTERS

350

330

SET OF NESTED LOOPS

INCREMENT LOOP INDEX AND SYNCHRONISATION COUNTER

READ DATA FROM INTERNAL BUFFER

345

WRITE DATA TO EXTERNAL MEMORY

340

MAINTAINING SYNCHRONISATION BETWEEN MEMORY WRITING AND READING BLOCKS USING AN INTERNAL BUFFER AND A CONTROL CHANNEL

CROSS-REFERENCE TO RELATED APPLICATIONS AND CLAIM OF PRIORITY

This application is a continuation under 35 U.S.C. 120 of copending application Ser. No. 17/336,701 filed Jun. 2, 2021, now U.S. Pat. No. 11,775,206, which claims foreign priority under 35 U.S.C. 119 from United Kingdom Application Nos. 2008299.6 filed Jun. 2, 2020 and 2012814.6 filed Aug. 17, 2020, the contents of which are incorporated by reference herein in their entirety.

BACKGROUND

Manipulation of data in a memory is a key enabling task in data processing systems. It is particularly relevant in the field of machine learning, where the data—for example, input or output data of a layer of a neural network—may comprise a large, multidimensional array.

Ultimately, physical memory is accessed as a one-dimensional, linear structure. Therefore, in order to be stored in a physical memory, any multidimensional array must be written out as a one-dimensional sequence of values. These values may be stored at successive locations in one contiguous block of memory. (For the purposes of the present disclosure, fragmentation effects can be ignored.)

A multidimensional array may be written to a one-dimensional memory in a variety of ways. However, different structures and formats may be useful in different circumstances, at different times. This creates a need to manipulate the data stored in memory.

In the context of neural network workloads (but not restricted to this context), it may be necessary to manipulate the data in such an array in a variety of ways. This may include transposing different dimensions of an array, resizing or concatenating arrays, converting an array to a different format (for example, for input, for output, or for processing), and conversions such as depth-to-space, space-to-depth, batch-to-space or space-to-batch.

Conventionally, whenever such operations are required, the CPU (software) interacts with the memory to perform them.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A hardware unit for manipulating data stored in a memory is disclosed. The hardware unit comprises: an internal buffer; a memory reading block, configured to read the data from the memory and write the data to the internal buffer; a memory writing block, configured to read the data from the internal buffer and write the data to the memory. The hardware unit optionally also comprises a control channel between the memory reading block and the memory writing block, wherein the memory reading block and the memory writing block are configured to communicate via the control channel to maintain synchronisation between them when writing the data to the internal buffer and reading the data from the internal buffer, respectively. The hardware unit may be configured to apply one or more transformations to multidimensional data in the memory. The hardware unit may be configured to traverse the multidimensional array using a plurality of nested loops.

According to an aspect, there is provided a hardware unit for manipulating data stored in a memory, the hardware unit comprising: an internal buffer; a memory reading block, configured to read the data from the memory and write the data to the internal buffer; a memory writing block, configured to read the data from the internal buffer and write the data to the memory; and a control channel between the memory reading block and the memory writing block, wherein the memory reading block and the memory writing block are configured to communicate via the control channel to maintain synchronisation between them when writing the data to the internal buffer and reading the data from the internal buffer, respectively.

The memory is typically an external memory, which is external to the hardware unit. Each memory access block (that is, the memory reading block and the memory writing block) has access to the external memory.

The memory reading block and the memory writing block may be collectively configured such that the data when written to the memory by the memory writing block is transformed relative to the data that was read by the memory reading block. The transformation may comprise one or more of: transposing different dimensions of an array, resizing or concatenating arrays, converting an array to a different format, and conversions such as depth-to-space, space-to-depth, batch-to-space and space-to-batch.

The data may comprise a multidimensional array comprising a plurality of data elements, wherein at least one of the memory reading block and the memory writing block is configured to traverse the multidimensional array using a plurality of nested loops, each loop having associated with it a corresponding stride between data elements of the multidimensional array.

"Nested" loops means that at least one inner loop iterates multiple times within each iteration of at least one outer loop.

At least one loop of the plurality of nested loops is optionally configured to iterate a different number of times depending on at least one of: (a) a loop index of at least one other loop of the plurality of nested loops; and (b) a software configurable flag.

This can allow the at least one loop to change its size dynamically (at runtime) based on how the different data dimensions are traversed in the operation being performed. This can occur either in the memory reading block or the memory writing block. The loop index associated with a loop indicates the number of the current iteration of that loop. In some embodiments, setting a software configurable flag allows the current loop to iterate a different number of times, depending on the loop index of the other loop(s). That is, the loop may be configured to iterate a different number of times conditional on the loop index of at least one other loop and conditional on the software configurable flag.

Each loop of the plurality of loops is optionally configured to perform a variable number of iterations, the variable number being selected at runtime from a group comprising: a first number of iterations to be performed when one or more outer loops of the plurality of nested loops are not in their end iteration; a second number of iterations to be performed when the one or more outer loops of the plurality of nested loops are in their end iteration; and optionally a third number of iterations to be performed when the software configurable flag is not set. The "end" iteration is typically the last iteration. However, the inverse approach could be taken, whereby the "end" iteration is the first iteration. The use of the first number and second number of iterations may be conditional on the software configurable flag being set.

The memory reading block is optionally configured to read the data from the memory in discrete bursts and/or the memory writing block is optionally configured to write the data to the memory in discrete bursts, the discrete bursts having a predetermined first size, wherein the memory reading block is optionally configured to write the data to the internal buffer in discrete units and/or the memory writing block is optionally configured to read the data from the internal buffer in discrete units, the discrete units having a second size, wherein the second size is different from the first size.

Each burst typically has a fixed size, which is usually determined by the hardware implementation. The dimensions of the multidimensional arrays to be manipulated generally do not align neatly with the burst-size. For example, the size of the array in each dimension is generally not an integer multiple of the burst-size. The internal buffer of the hardware unit may be configured to index data in smaller units than the burst size used in transactions with the memory. That is, the second size may be smaller than the first size. The second size may be one byte, for example.

The data may comprise a multidimensional array comprising a plurality of data elements, wherein at least one of the memory reading block and the memory writing block is optionally configured to traverse the multidimensional array using a plurality of nested loops, each loop having associated with it a corresponding stride between data elements of the multidimensional array, wherein, when reading or writing a desired segment of the multidimensional array, said at least one block is optionally configured to select the number of iterations in at least one loop, based on a relationship between the size of the desired segment and the first size.

Said at least one block may be configured to: determine, based on said relationship, that a discrete burst to be read or written contains extra data, which is additional to the desired segment and which is scheduled to be read or written in a later iteration of at least one of the plurality of loops; and in response, to operate on the extra data in the current iteration according to an operation scheduled for said later iteration. To do this, the number of iterations of at least one loop is modified (in particular, increased), to operate on the extra data. The loop with this modified number of iterations is said to be "aligned" with the burst, or "burst-aligned".

The later iteration of the at least one of the plurality of loops may be the next iteration of that loop.

Operating on the extra data may mean, in particular, that the final data element in the burst is processed in the current iteration. That is, the operation continues to the end of the burst.

The loops of the memory reading block and/or memory writing block can be configured to read (or write) a burst of data from (or to) the memory to operate on desired segments of the multidimensional array. The hardware unit can determine that the burst contains data additional to the desired segment. Since this may potentially be required in a later iteration of at least one of the loops, the hardware unit can manipulate in advance the extra data, during the loop iteration that reads or writes the relevant burst.

Operating on the extra data in a discrete burst to be read may comprise writing it to the internal buffer at the same location as it would be written in said later iteration.

Operating on the extra data in a discrete burst to be written may comprise reading it from the internal buffer from the same location as it would be read in said later iteration. This operating on extra data is typically not done for the end iteration because it is assumed that, for the end iteration, there is no extra data. Consequently, the modified number of iterations necessary to achieve burst-alignment is an example of a first number of iterations to be performed when one or more outer loops of the plurality of nested loops are not in their end iteration.

The data may comprise a multidimensional array comprising a plurality of data elements, wherein the multidimensional array is stored in the memory in a storage format having storage units of a predetermined third size, wherein one or more dimensions of the multidimensional array are not an integer multiple of the third size.

Sometimes, it may be desired to store a multidimensional array in a storage format that mandates storage units with specific sizes. The dimensions of the multidimensional array may not match these specific sizes or divide neatly into them. In these circumstances, the endings of the multidimensional array dimensions may not align with a unit of the storage format.

At least one of the memory reading block and the memory writing block may be configured to traverse the multidimensional array using a plurality of nested loops, each loop having associated with it a corresponding stride between data elements of the multidimensional array, wherein said at least one block is optionally configured to select, for at least one loop of the plurality of nested loops, a different number of iterations when one or more outer loops are in their end iteration, as compared with the number of iterations of said at least one loop when the one or more outer loops are not in their end iteration. This different number of iterations is an example of a "second" number of iterations, as discussed previously above.

Optionally, the different number of iterations selected when the one or more outer loops are in their end iteration is smaller than when the one or more outer loops are in other iterations. The smaller number of iterations may be selected to avoid redundant read or write operations beyond the end of the multidimensional array.

Optionally, the different number of iterations selected when the one or more outer loops are in their end iteration is larger than when the one or more outer loops are in other iterations. The larger number of iterations may be selected to merge the final two or more iterations of the one or more outer loops. For example, the number of iterations may be enlarged so that, in the second last iteration of an outer loop, the at least one (inner) loop also carries out the operations that it would normally have carried out in the last iteration of the outer loop. In other words, what would have been the second last iteration in fact becomes the last iteration.

The synchronisation between the memory reading block and memory writing block (provided by the communication through the control channel) may ensure that no data is overwritten in the internal buffer by the memory reading block while it is still needed by the memory writing block. Furthermore, the synchronisation may ensure that data is not read from the internal buffer by the memory writing block until it has been validly written to the internal buffer by the memory reading block. Each of the memory reading block and the memory writing block may have a respective synchronisation counter, the blocks being configured to communicate their synchronisation counters with each other via the control channel, wherein the hardware unit is configured to maintain synchronisation between the blocks by comparing the synchronisation counters.

To maintain synchronisation, the operation of one block may be paused if the difference between the respective synchronisation counters exceeds a predetermined threshold. Each synchronisation counter may be incremented by the respective block in each iteration of a predetermined loop.

The comparison between the synchronisation counters may be performed by the memory reading block and/or memory writing block. Alternatively, the control channel may comprise logic circuits to perform this comparison.

The data may comprise a multidimensional array comprising a plurality of data elements, wherein each of the memory reading block and the memory writing block is configured to traverse the multidimensional array using a respective plurality of nested loops, each loop having associated with it a corresponding stride between data elements of the multidimensional array, wherein the synchronisation counter of the memory reading block may be associated with a first loop of its plurality of loops and the synchronisation counter of the memory writing block may be associated with a second loop of its plurality of loops.

The first loop and the second loop may be at the same or different levels of the respective nests of loops.

Also provided is a hardware-implemented method of manipulating data stored in a memory, the data comprising a multidimensional array comprising a plurality of data elements, the method comprising: (i) reading the data from the memory and writing the data to the internal buffer; and (ii) reading the data from the internal buffer and writing the data to the memory, wherein at least one of the steps (i) and (ii) is performed using a plurality of nested loops, each loop having associated with it a corresponding stride between data elements of the multidimensional array.

The method may be a method for a hardware unit. The memory may be external to the hardware unit. Synchronisation is preferably maintained between steps (i) and (ii) when writing the data to the internal buffer and reading the data from the internal buffer. The synchronisation may ensure that no data is overwritten in the internal buffer by step (i) while it is still needed for step (ii). Furthermore, the synchronisation may ensure that data is not read from the internal buffer by step (ii) until it has been validly written to the internal buffer by step (i).

Step (ii) may begin before step (i) is completed. In particular, step (ii) may begin when step (i) is only partially complete—that is, when only part of the data has been read from the memory and written to the internal buffer.

At least one loop of the plurality of nested loops may be configured to iterate a different number of times depending on at least one of: (a) a loop index of at least one other loop of the plurality of nested loops; and (b) a software configurable flag.

Each loop of the plurality of loops may be configured to perform a variable number of iterations, the variable number being selected at runtime from a group comprising: a first number of iterations to be performed when one or more outer loops of the plurality of nested loops are not in their end iteration; a second number of iterations to be performed when the one or more outer loops of the plurality of nested loops are in their end iteration; and optionally a third number of iterations to be performed when the software configurable flag is not set.

Optionally: the data is read from the memory in discrete bursts; and/or the data is written to the memory in discrete bursts, the discrete bursts having a predetermined first size, wherein the data is written to the internal buffer in discrete units; and/or the data is read from the internal buffer in discrete units, the discrete units having a second size, wherein the second size is different from the first size.

The method may comprise, when reading or writing a desired segment of the multidimensional array from or to the memory, respectively, selecting the number of iterations in at least one loop, based on a relationship between the size of the desired segment and the first size The method may comprise: determining, based on said relationship, that a discrete burst to be read from the memory or written to the memory contains extra data, which is additional to the desired segment and which is scheduled to be read or written in a later iteration of at least one of the plurality of loops; and in response, operating on the extra data in the current iteration according to an operation scheduled for said later iteration.

The multidimensional array may be stored in the memory in a storage format having storage units of a predetermined third size, wherein one or more of the dimensions of the multidimensional array are not an integer multiple of the third size.

The method may comprise selecting, for at least one loop of one of the pluralities of loops, a different number of iterations, when one or more outer loops of the plurality are in their end iteration, as compared with the number of iterations of said at least one loop when said one or more outer loops are not in their end iteration.

In particular, the different number of iterations may be selected so that redundant (unnecessary) iterations are avoided, in the end iteration of the one or more outer loops.

The method may further comprise: maintaining a first synchronisation counter associated with a first loop among the plurality of loops performing step (i), wherein the first synchronisation counter is incremented with each iteration of the first loop; maintaining a second synchronisation counter associated with a second loop among the plurality of loops performing step (ii), wherein the second synchronisation counter is incremented with each iteration of the second loop; comparing a current value of the first synchronisation counter with a current value of the second synchronisation counter; and controlling the progress of step (i) and or step (ii) based on a result of the comparison.

If the first synchronisation counter exceeds the second synchronisation counter by more than a predetermined threshold, the method may comprise pausing step (i). If the second synchronisation counter exceeds the first synchronisation counter by more than a predetermined threshold, the method may comprise pausing step (ii).

Also provided is a neural network accelerator system configured to perform a method as summarized above.

A hardware unit or neural network accelerator system as summarized above may be embodied in hardware on an integrated circuit.

Also provided is a method of manufacturing, using an integrated circuit manufacturing system, a hardware unit or neural network accelerator system as summarized above.

Also provided is a method of manufacturing, using an integrated circuit manufacturing system, a hardware unit or neural network accelerator system as summarized above, the method comprising: processing, using a layout processing system, a computer readable description of the hardware unit or neural network accelerator system so as to generate a circuit layout description of an integrated circuit embodying the hardware unit or neural network accelerator system; and manufacturing, using an integrated circuit generation system, the hardware unit or neural network accelerator system according to the circuit layout description.

Also provided is computer readable code configured to cause a method as summarized above to be performed when the code is run.

Also provided is a computer readable storage medium having encoded thereon the computer readable code.

Also provided is an integrated circuit definition dataset that, when processed in an integrated circuit manufacturing system, configures the integrated circuit manufacturing system to manufacture a hardware unit or neural network accelerator system as summarized above.

Also provided is a non-transitory computer readable storage medium having stored thereon a computer readable description of a hardware unit or neural network accelerator system as summarized above that, when processed in an integrated circuit manufacturing system, causes the integrated circuit manufacturing system to manufacture an integrated circuit embodying the hardware unit or neural network accelerator system.

Also disclosed is a non-transitory computer readable storage medium having stored thereon a computer readable description of a hardware unit or neural network accelerator system as summarized above, which, when processed in an integrated circuit manufacturing system, causes the integrated circuit manufacturing system to: process, using a layout processing system, the computer readable description of the hardware unit or neural network accelerator system so as to generate a circuit layout description of an integrated circuit embodying the hardware unit or neural network accelerator system; and manufacture, using an integrated circuit generation system, the hardware unit or neural network accelerator system according to the circuit layout description.

Also provided is an integrated circuit manufacturing system configured to manufacture a hardware unit or neural network accelerator system as summarized above.

Also provided is an integrated circuit manufacturing system comprising: a non-transitory computer readable storage medium having stored thereon a computer readable description of a hardware unit or neural network accelerator system as summarized above; a layout processing system configured to process the computer readable description so as to generate a circuit layout description of an integrated circuit embodying the hardware unit or neural network accelerator system; and an integrated circuit generation system configured to manufacture the hardware unit or neural network accelerator system according to the circuit layout description.

The layout processing system may be configured to determine positional information for logical components of a circuit derived from the computer readable description so as to generate the circuit layout description of the integrated circuit embodying the hardware unit or neural network accelerator system The hardware unit may be embodied in hardware on an integrated circuit. There may be provided a method of manufacturing, at an integrated circuit manufacturing system, a hardware unit. There may be provided an integrated circuit definition dataset that, when processed in an integrated circuit manufacturing system, configures the system to manufacture a hardware unit. There may be provided a non-transitory computer readable storage medium having stored thereon a computer readable description of a hardware unit that, when processed in an integrated circuit manufacturing system, causes the integrated circuit manufacturing system to manufacture an integrated circuit embodying a hardware unit.

There may be provided an integrated circuit manufacturing system comprising: a non-transitory computer readable storage medium having stored thereon a computer readable description of the hardware unit; a layout processing system configured to process the computer readable description so as to generate a circuit layout description of an integrated circuit embodying the hardware unit; and an integrated circuit generation system configured to manufacture the hardware unit according to the circuit layout description.

There may be provided computer program code for performing any of the methods described herein. There may be provided non-transitory computer readable storage medium having stored thereon computer readable instructions that, when executed at a computer system, cause the computer system to perform any of the methods described herein.

The above features may be combined as appropriate, as would be apparent to a skilled person, and may be combined with any of the aspects of the examples described herein.

BRIEF DESCRIPTION OF THE DRAWINGS

Examples will now be described in detail with reference to the accompanying drawings in which.

Figure 1A:
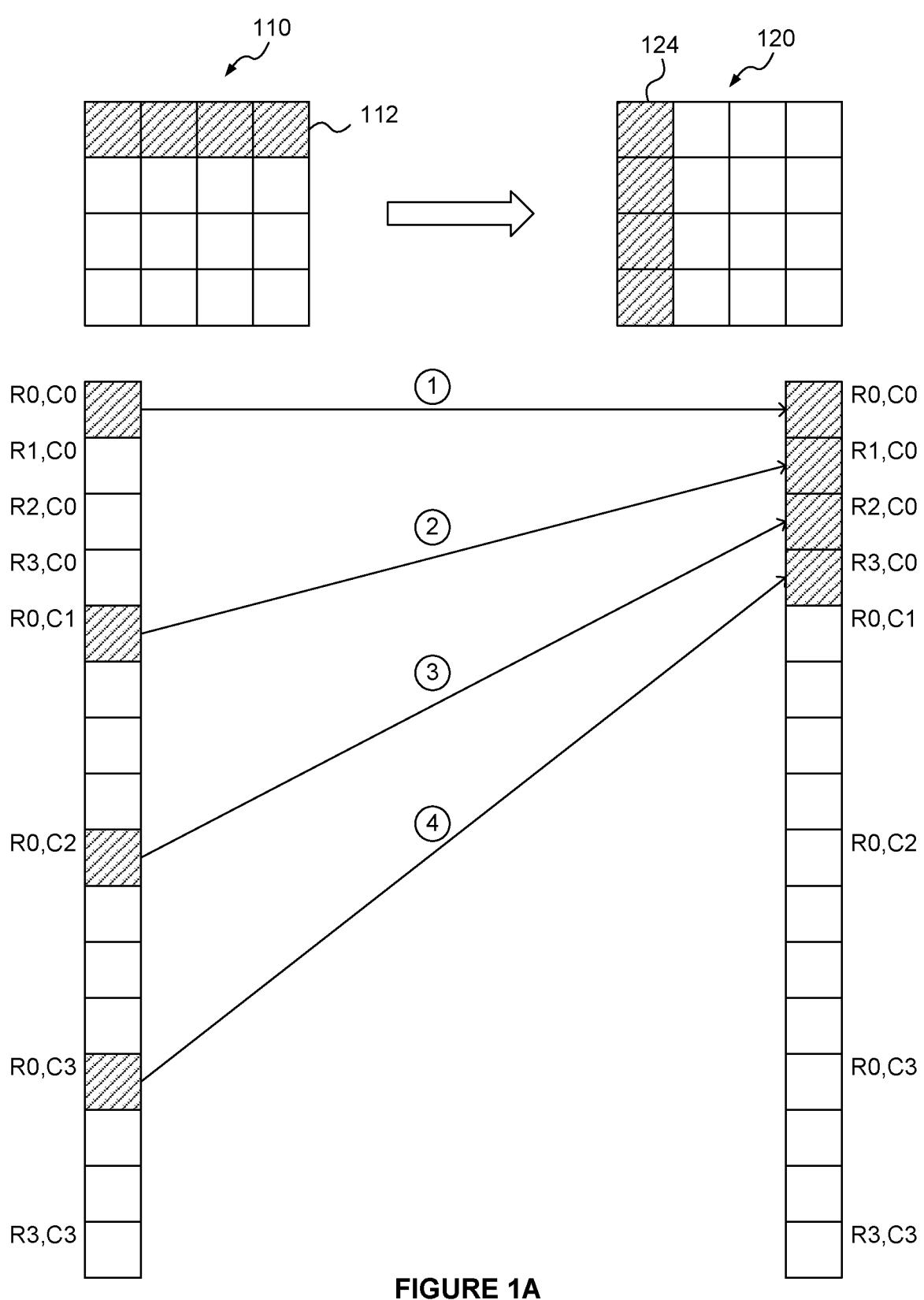
FIG. 1A illustrates a first example of a two-dimensional array being transposed.

The accompanying drawings illustrate various examples. The skilled person will appreciate that the illustrated element boundaries (e.g., boxes, groups of boxes, or other shapes) in the drawings represent one example of the boundaries. It may be that in some examples, one element may be designed as multiple elements or that multiple elements may be designed as one element. Common reference numerals are used throughout the figures, where appropriate, to indicate similar features.

DETAILED DESCRIPTION

The following description is presented by way of example to enable a person skilled in the art to make and use the invention. The present invention is not limited to the embodiments described herein and various modifications to the disclosed embodiments will be apparent to those skilled in the art.

Embodiments will now be described by way of example only.

US 12,602,185 B2

Figure 1B:
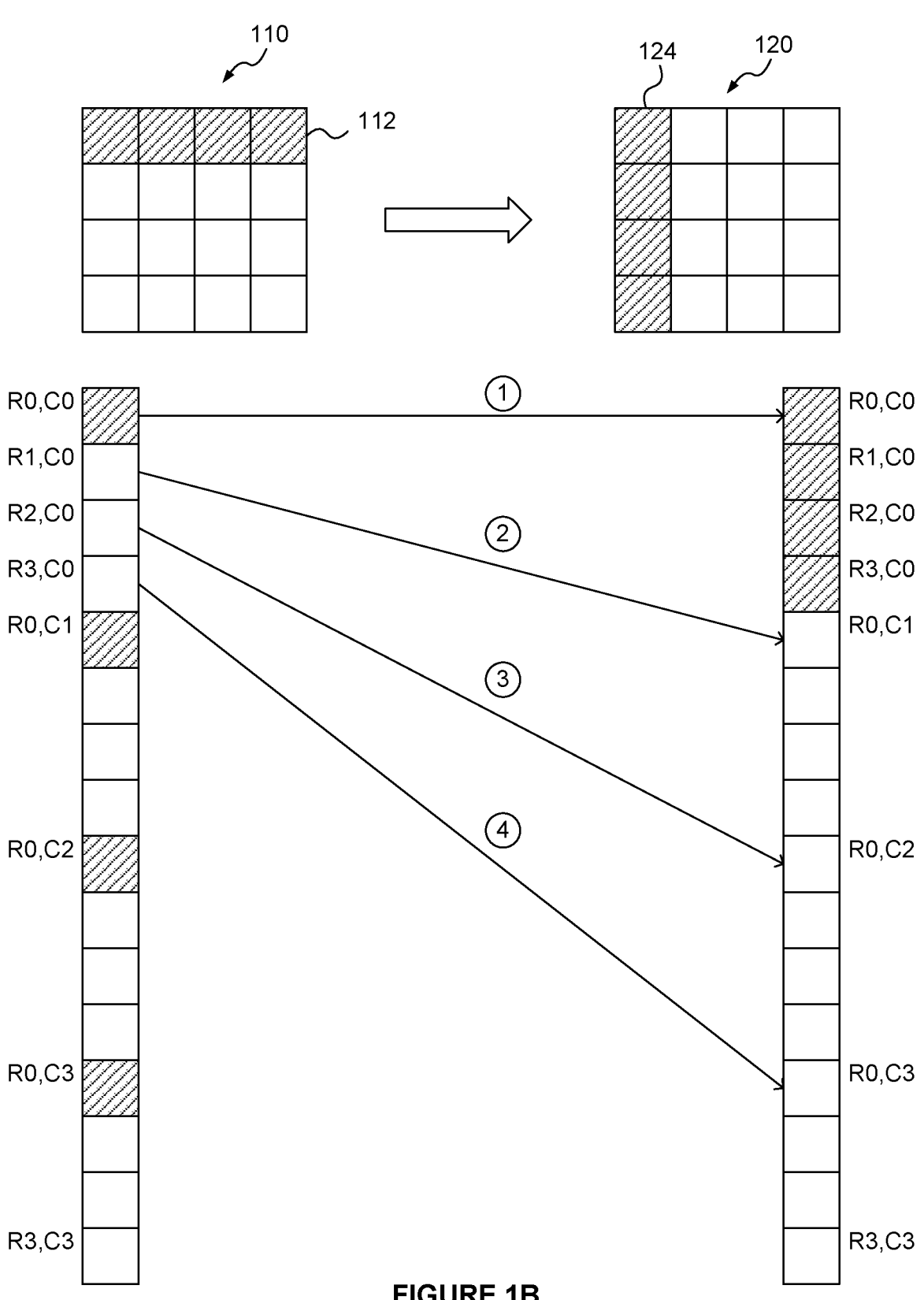
FIG. 1B illustrates a second example of the array of FIG. 1A being transposed.

FIGS. 1A and 1B illustrate examples of manipulating data in a memory. Referring to the left hand side of FIG. 1A, a 4×4 array 110 is stored in memory in column-first format. That is, the first four data elements stored in the memory are the data elements of the first column of the array; the second four elements stored in the memory are the data elements of the second column of the array. The upper representation is the two-dimensional representation of the array; the lower representation shows the one-dimensional arrangement of the data elements in memory. The notation "Rn, Cn" (Row n, Column n) alongside the one-dimensional representation indicates the position of each data element in the two-dimensional array. The first data element in the memory is the element at row 0 column 0, the second data element is the element at row 1, column 0, and so on.

It is desired to transpose the array 110, such that each row of the original array becomes a column of the transposed array 120 and each column of the original array becomes a row of the transposed array 120. In the top right of FIG. 1A, the two-dimensional representation of the transposed array 120 is shown. Below it is the one-dimensional representation of the transposed array (as laid out in the memory). The data elements of the first row 112 of the original array 110 are shown with a diagonal hatched pattern. These data elements will form the first column of the transformed (transposed) array 120.

The arrows in the lower part of the diagram indicate one way of moving these elements from the original array 110 to the transposed array 120. As seen in FIG. 1A, the transpose operation can be carried out using a stride of 4 in the original array and a stride of 1 in the output (transposed) array. The element at R0, C0 is read from the first memory location of the input array. It is written to the first memory location of the output array. The read-pointer moves forward four memory locations (stride=4). The element at R0, C1 is then read from the fifth memory location. The write-pointer moves forward one memory location (stride=1). The element from R0, C1 in the input array is written to the second memory location in the output array. This corresponds to R1, C0 in the column-first format. The procedure is repeated until all four of the elements of the first row 112 of the input array 110 have been written to the first column 124 of the output array. The whole procedure is then repeated for each of the other three columns of the output array 120 (likewise, the other three rows of the input array 110) until, eventually, the entire output array has been populated.

The sequence of operations in the example of FIG. 1A is of course not the only possible sequence. FIG. 1B shows one of a number of possible alternative sequences. In FIG. 1B, the task is the same—namely, to transpose the input array 110 to generate the output array 120. Here, however, a stride of 1 is used to traverse the input array, while a stride of 4 is used to traverse the output array. The element at R0, C0 is read from the first memory location of the input array. It is written to the first memory location of the output array. (This is the same first step as in FIG. 1A.) The read-pointer then moves forward one memory location (stride=1). The element at R1, C0 in the input array 110 is read from the second memory location. The write-pointer moves forward four memory locations (stride=4). The element from R1, C0 in the input array is written to the fifth memory location in the output array. This corresponds to R0, C1 in the column-first format. The procedure is repeated until all four of the elements of the first column of the input array 110 have been written to the first row of the output array. The whole procedure is then repeated for each of the other three rows of the output array until, eventually, the entire output array has been populated.

Although the operation in FIGS. 1A and 1B has been described above as a transpose-operation, the same sequence of steps might equally be used to convert from a column-first storage format in memory to a row-first storage format.

The present inventors have recognised that memory operations like these can place a significant burden on a CPU. According to an example, it is therefore proposed to provide a dedicated hardware unit to handle the manipulation of data in memory. This "memory manipulation module" or MMM can remove burden from the CPU, and can be designed to perform transformations on data efficiently.

According to an example, the MMM treats data as a multi-dimensional array that is traversed in a specific way through a set of nested loops with associated strides (jumps between data). Conceptually, each loop is linked to a dimension (rows, columns, planes, groups, etc.) and is configured to iterate a certain number of times related to the dimension it covers. One potentially beneficial feature of the MMM is that it allows a loop to perform a different number of iterations depending on the status of one or more other loops. In particular, depending on whether one or more loops are not in an end iteration, or are in an end iteration, they can affect in different ways how many times another loop iterates. For example, the number of iterations may be modified to align the loop operations with memory read/write bursts, or to avoid wasted read/write operations beyond the end of a data structure. This functionality applies to all loops carrying out the read operations as well as those carrying out the writing operations.

One or more software configurable flags are provided. When one of these flags is set, it enables variations in the number of iterations. Every loop can be configured so that it iterates a number of times A, B or C:

A is the standard number of iterations. This number of iterations may be performed when no special conditions apply. In particular, this is the number of iterations performed when a software configurable flag is not set.

B is the number of iterations it must do to read or write to the end of a full burst. This is done when one or more outer loops (in the context of nested loops) are not in their end (e.g. last) iteration.

C is the number of iterations it does when one or more of the outer loops have reached an end (e.g. last) iteration.

The idea is that, depending on how the different data dimensions are traversed, loops can vary their number of iterations so that the overall operation (permute, reshape, etc.) is done more efficiently. It is easiest to consider the variation in the number of iterations by imagining strides stepping forwards through the array, from first to last elements. In this case, options B and C make above make a distinction between a loop being in its last iteration or not in its last iteration. However, it should be understood that the approach can also be applied in reverse, stepping backwards through the array. In this case, the key distinction is between the first iteration and iterations other than the first. A generic reference to the "end" iteration will be used herein to encompass both possibilities—that is, the "end" iteration may be the first or last iteration. The fact that the examples may refer to the "last" iteration does not mean that the scope of the present disclosure is limited to this possibility. Note that the numbers B and C are not fixed numbers—they may be different in different iterations, depending on the conditions of one or more outer loops and the relationship between the burst size and the data-dimensions.

Figure 2:
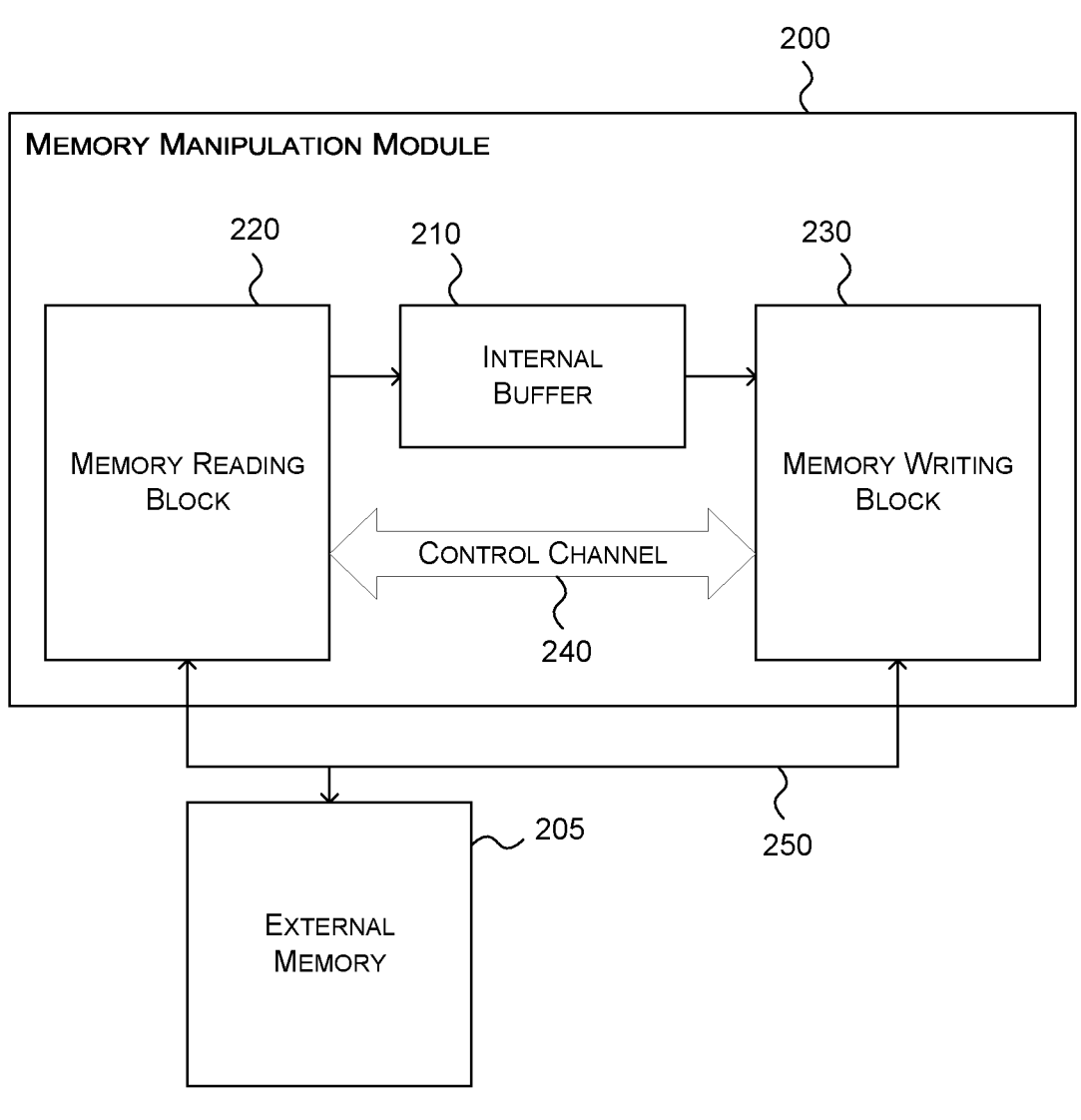
FIG. 2 is a block diagram of a memory manipulation module according to an example.

FIG. 2 is a block diagram of a hardware unit (memory manipulation module) 200 according to an example. The MMM is coupled to a memory, external memory 205, via a bus 250. The MMM 200 comprises a memory reading block 220; an internal buffer 210; and a memory writing block 230. A control channel 240 is used to coordinate the operations performed by the memory reading block 220 and the memory writing block 230. Both the memory reading block 220 and the memory writing block 230 are coupled to the bus 250. An output of the memory reading block 220 is coupled to an input of the internal buffer 210. An input of the memory writing block 230 is coupled to an output of the internal buffer 210.

Figure 3:
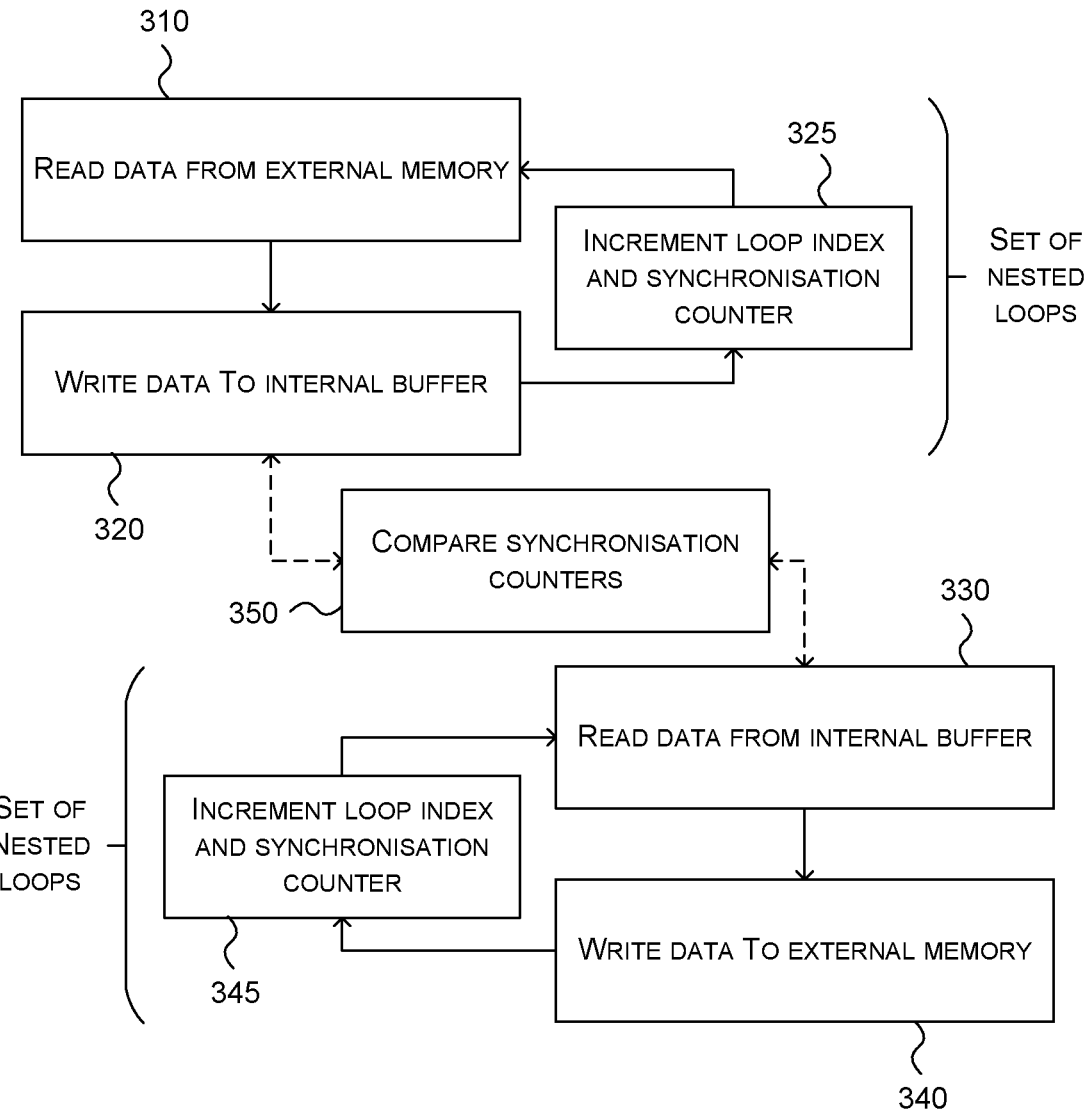
FIG. 3 is a flowchart illustrating a method performed by the memory manipulation module according to an example.

FIG. 3 is a flowchart illustrating a method performed by the MMM of FIG. 2. In step 310, the memory reading block 220 reads data from the external memory 205. In step 320, the memory reading block 220 writes the data (that was read from the external memory 205) to the internal buffer 210. In step 330, the memory writing block 230 reads data from the internal buffer 210; and in step 340, the memory writing block 230 writes the data (that was read from the internal buffer 210) back to the external memory 205.

By the combination of operations performed by the memory reading block 220 and the memory writing block 230, the data is transformed. The transformation may occur when moving the data from the memory 205 to the internal buffer 210, or it may occur when moving the data from the internal buffer 210 to the memory 205. In some cases, the transformation may occur in part between the memory 205 and the internal buffer 210, and in part between the internal buffer 210 and the memory 205.

Because the memory reading block 220 and the memory writing block 230 are provided as separate hardware blocks, they are able to operate in parallel. That is, the memory reading block 220 can be performing steps 310 and 320 while the memory writing block 230 is performing steps 330 and 340. The control channel 240 provides for communication between the memory reading block 220 and the memory writing block 230, to maintain at least loose synchronisation between the two blocks. Without this synchronisation, race conditions might occur—the memory writing block 230 could attempt to read data from the internal buffer 210 before it has been written to the buffer by the memory reading block 220; or the memory reading block 220 could overwrite data in the internal buffer 210 before it has been read by the memory writing block 230. The synchronisation via the control channel 240 can avoid this by pausing the operation (i.e. the block) that is "ahead" until the other operation/block has caught up.

The data being read from and written to the external memory 205 is a multidimensional array comprising a plurality of data elements (like the two-dimensional example of FIG. 1). Each of the memory access blocks (that is, the memory reading block 220 and the memory writing block 230) is configured to traverse the multidimensional array using a set of nested loops. Each loop of the set of nested loops has associated with it a stride between data elements of the multidimensional array. Using the two-dimensional example of FIG. 1A, described above, the innermost loop of the memory reading block 220 is stepping through the elements of a row (that is, it iterates over columns). Because the array 110 is stored column-wise in the memory, this inner loop of the memory reading block 220 has a stride of four. The innermost loop of the memory writing block 230 steps through the elements of a column; therefore it has a stride of one.

In each block 220, 230, each loop of the set of nested loops iterates multiple times within each iteration of the loops outside it. In the two-dimensional example of FIG. 1A, the set of nested loops in each block 220, 230 consists of two loops—an inner loop and an outer loop. The outer loop at the memory reading block 220 iterates over the rows. The outer loop at the memory writing block 230 iterates over the columns.

Each loop has a loop index associated with it. The loop index indicates the current iteration of that loop. Each block 220, 230 also has a synchronisation counter associated with at least one of its plurality of loops. The synchronisation counters are associated with the loops at the relevant level to maintain synchronisation. Note that the synchronisation counter of the memory reading block 220 may be associated with a loop at a different level from the synchronisation counter of the memory writing block 230. Typically, synchronisation is done at the first level (that is, the highest/outermost level) for which all the loops outside the synchronisation level have the same meaning and traverse the array in the same manner in both memory access blocks. It is assumed that loops traversing the data in the same manner are inherently synchronised and do not require synchronisation to be controlled via the synchronisation counters. The software can decide the appropriate levels for synchronisation. In some cases, it is possible to synchronise at a lower level (that is, a level having at least one level above/outside it for which the memory reading block and memory writing block do not traverse the array in the same way). Synchronisation at such a level will work provided the synchronisation counters maintain a large enough offset to force sufficient processing to have occurred by whichever memory access block is lagging. Take, for example, a loop of the memory reading block 220 that reads 12 data values, one by one, while a loop of the memory output block 230 writes every fourth value. This is illustrated in Table 1 below. The top row indicates the loop index for the read operations; the bottom row indicates the corresponding loop index for the write operations. Read iteration 11 needs to occur before write operation 2; therefore, to synchronise these loops via a single offset, an offset of at least 9 should be used.

TABLE 1

| Reading and writing with synchronisation offset | | | | | | | | | | | |
|---|---|---|---|---|---|---|---|---|---|---|---|
| 0 | 1 | 2 | 3 | 4 | 5 | 6 | 7 | 8 | 9 | 10 | 11 |
| | | | 0 | | | | 1 | | | | 2 |

As indicated in FIG. 3, the steps 310 and 320 of reading and writing data, by the memory reading block 22, are performed iteratively, by a set of nested loops. In each iteration, at step 325, at least the loop index of the current loop is incremented. When a given loop completes its final iteration, control is returned to the loop at the next level (that is, the loop outside the current loop), for the next iteration of that loop. When the loop index of the loop that controls synchronisation is incremented, the synchronisation counter is also incremented.

Similarly, at the memory writing block 230, the steps 330 and 340 of reading and writing data are performed iteratively by another set of nested loops. In each iteration, in step 345, at least the loop index of the current loop is incremented. When the current loop completes its final iteration, control is returned to the loop at the next lowest (innermost) level, for the next iteration of that loop. For the loop at the level that controls synchronisation, the synchronisation counter of the memory writing block 230 is incremented each time the loop index is incremented.

Figure 4:
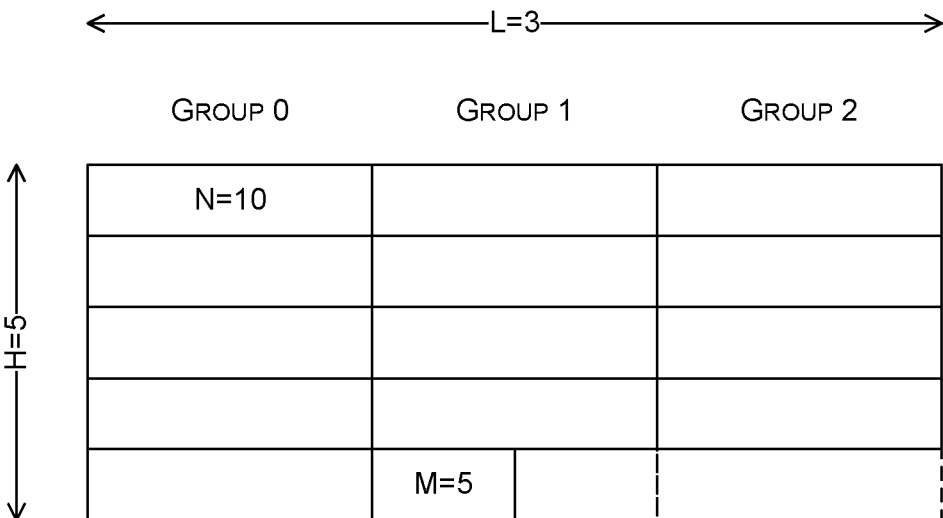
FIG. 4 shows a logical arrangement of data in a storage format with storage units of a predetermined size.

In order to avoid race conditions, the memory reading block 220 compares its synchronisation counter with the synchronisation counter of the memory writing block 230, before writing the data to the internal buffer 210 in step 320. This is indicated in FIG. 4 by step 350. If the synchronisation counter of the memory writing block 230 is too far behind the synchronisation counter of the memory reading block 220, the memory reading block pauses its operation until the synchronisation counter of the memory writing block 230 increases (that is, until the memory writing block 230 "catches up"). Similarly, the memory writing block 230 compares its synchronisation counter with the synchronisation counter of the memory reading block 220 before reading data from the internal buffer 210 in step 330. If the synchronisation counter of the memory reading block 220 is too far behind the synchronisation counter of the memory writing block 230, the memory writing block pauses its operation until the synchronisation counter of the memory reading block 220 increases (that is, until the memory reading block 220 "catches up"). Whether one block is "too far behind" the other depends on the offset between the synchronisation counters, which in turn depends on the operation being performed. It may also depend on the size of the internal buffer. It is therefore not a fixed number of iterations but varies on a case-by-case basis.

As mentioned above, one or more loops of the plurality of nested loops of each block 220, 230 may be configured to perform a different number of iterations depending on the loop index of at least one other loop. An example of this will now be described with reference to FIG. 4.

FIG. 4 schematically illustrates data stored in the memory 205 in a storage format with storage units of a predetermined size. In particular, the storage format comprises H=5 lines, with L=3 three groups in each line (Group 0, Group 1, Group 2), and with N=10 values in each group. The data does not completely fill this storage format. The final line contains only two groups, the latter of which contains only M=5 (instead of N=10) values.

In order to read the data from the memory, the memory reading block 220 implements the following set of three nested loops:

```
for line in H{
    for group in L{
        for value in N{
            read value
        }
    }
}
```

In a basic implementation, the innermost loop (over values N) would always iterate 10 times and the middle loop (over groups L) would always iterate three times. However, this would result in redundant read operations, reading from groups of values beyond the end of the multidimensional array. (The logical locations of these potential redundant read operations are denoted by dashed lines in FIG. 4.) According to the present example, the innermost loop and the middle loop are cut short, in the final iteration of the outermost loop, to avoid these redundant read operations. In particular, when the outermost loop (over lines H) is in its final iteration (that is, when processing the last line), the middle loop (over groups L) is set to iterate only 2 times, instead of 3 times. When the outermost loop is in its final iteration and the middle loop is in its final iteration, the innermost loop (over values) is set to iterate M=5 times instead of 10 times (in contrast to N). This ensures that no redundant read operations are performed. In this example, the operation of the middle loop (over groups L) is controlled by the outermost loop (over lines H). And the operation of the innermost loop (over values) is controlled by a combination of the outermost loop and the middle loop. This shows one useful example of how the ability to adapt the number of iterations can improve the efficiency of the system.

Although the above example of FIG. 4 was presented in terms of read operations performed by the memory reading block 220, it will be understood that the same principle applies to write operations performed the memory writing block 230.

Figure 5A:
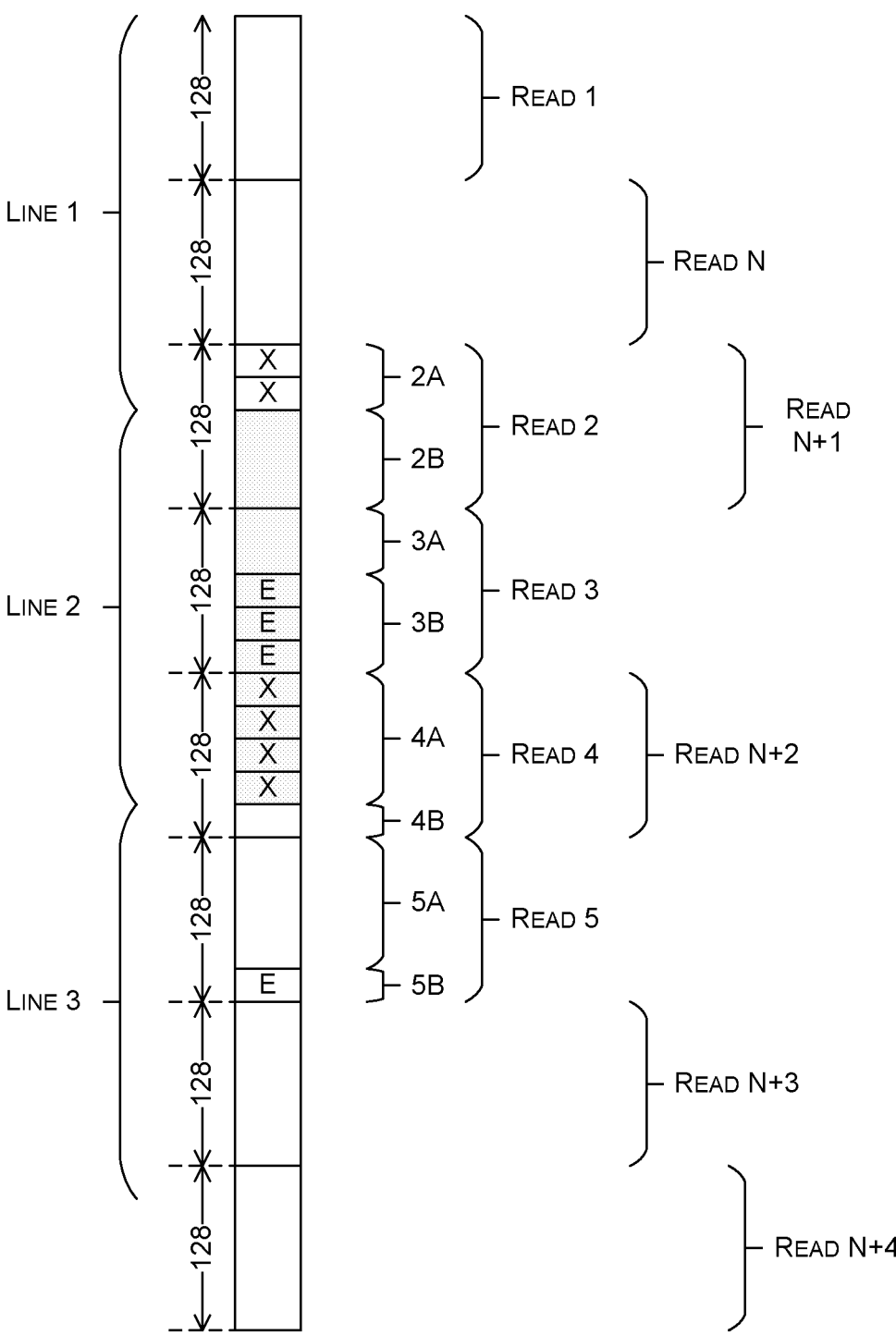
FIG. 5A illustrates a series of read operations, to read segments of data from an external memory, in order to transform the data to a different form.

The ability to modify the number of iterations in a loop can also be useful in other circumstances. FIG. 5 illustrates an example in which it is desired to reshape lines of data into a set of rectangular arrays. FIG. 5A shows the original lines of data stored in the memory 205. The first line (Line 1) and the third line (Line 3) are shown without shading; the second line (Line 2) is shown shaded in grey for ease of distinction. Figure shows the logical representation of the reshaped data populating the rectangular arrays (indicated by dotted lines). This is the logical representation of the data in the internal buffer; however, the data is generally not arranged in the buffer in this exact way, in practice. The internal buffer is constantly being reused—the memory writing block writes out to the external memory the data that has already been processed, and the memory reading block then (over-)writes fresh data into the internal buffer in its place. For the purposes of this example, it is assumed that the data is read from the memory 205 in discrete bursts, with each burst consisting of 128 values. The data is written to the internal buffer in discrete units. In this example, the discrete units consist of one value. It is also assumed that the data is being rearranged into rectangles with a height of 128 values (that is 128 values per column). However, the number of data values in each line is not an integer multiple of 128. This means that, although the first column of the first rectangle is aligned with a 128-value burst, subsequent columns are not aligned with bursts.

In this example, there are three loops in the memory reading block 220. An outermost loop iterates over the position within each line; an intermediate loop iterates over the different lines; and an innermost loop iterates over the individual data values. In each iteration of the innermost loop, a burst of data can be read (if required) and a data value is written to the internal buffer 210.

Figure 5B:
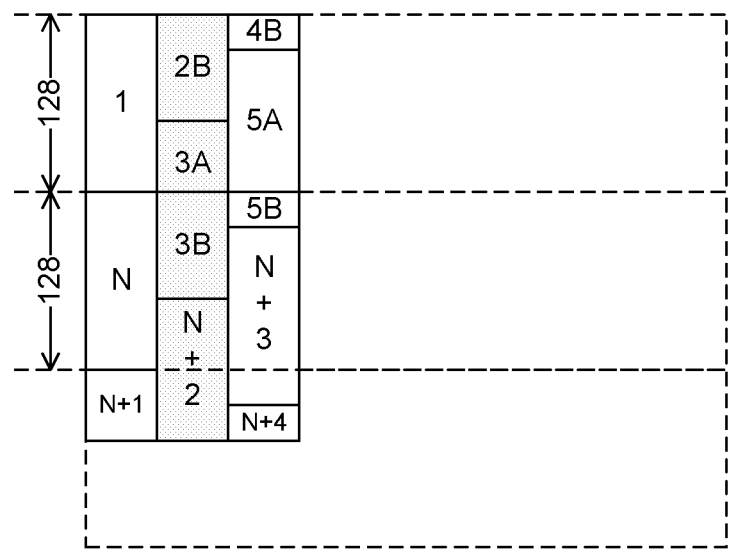
FIG. 5B shows a logical arrangement of the segments of data after the transformation.

The first task is to perform the first iteration of the intermediate loop in the first iteration of the outermost loop. In the example, this will involve 128 iterations of the innermost loop. To do this, in a first read operation ("Read 1"), in the first iteration of the innermost loop, the memory reading block 220 reads 310 a segment consisting of the first 128 values from Line 1, in one burst (see FIG. 5A). The first value is written 320 to the internal buffer 210 in the first iteration of the innermost loop. In the remaining 127 iterations of the innermost loop, the other 127 values in this segment are written 320 to the internal buffer 210, to populate the first column of the top rectangle (FIG. 5B). Note that, in this example, no read operations are required in the latter 127 iterations of the innermost loop, because all 128 values have already been obtained in the single read operation in the first iteration. In FIG. 5B, the number "1" denotes the data that was read in Read 1. The next task (second iteration of the intermediate loop) is to begin populating the second column of the top rectangle with data from Line 2. However, the start of Line 2 is not aligned with a memory-read burst. Consequently, two read operations must be performed in order to bring the first 128 values of Line 2 into the buffer 210. Accordingly, in the second read operation ("Read 2"), the memory reading block 220 reads 310 a burst of data that includes the start of Line 2. This burst includes the desired segment 2B at the start of Line 2, as well as some unwanted data values in segment 2A, which are discarded. (These discarded data values are denoted by the letter "X" in FIG. 5A.) The values of the desired segment 2B (that is, the values other than those discarded X) are written 320 to the buffer 310 at the top of the second column of the top rectangle. Discarding the unwanted data values involves starting the innermost loop only at the start of the segment 2B, following Read 2.

To read the remainder of the first 128 data values in Line 2 (to complete the second iteration of the intermediate loop), the memory reading block 220, in a third read operation ("Read 3"), in a later iteration of the innermost loop, reads the next burst of data from the memory 205. This includes a desired segment of values 3A (the remainder of the first 128 values of the second line). However, because of the lack of alignment between bursts and columns, it also contains extra data values (denoted by the letter "E") in a segment 3B. In a basic implementation, these extra values E would be discarded. However, it would be beneficial to retain them, because they will be needed in a subsequent iteration, to populate a subsequent rectangle in the reshaped data (see the middle rectangle in FIG. 5B).

According to the present example, the memory reading block 220 writes 320 the extra data E to the buffer 210, in the correct location—that is, in the location where it would be placed in the later iteration. This involves modifying the number of iterations of the innermost loop at the memory reading block 220, to increase the number of iterations that write values to the buffer 210. Instead of just writing segments 2B+3A to the buffer (which would be all that is required to write the block that this iteration of the intermediate loop is concerned with) the memory reading block writes segments 2B+3A+3B.

At this point, the second column in the first (top) rectangle has been populated (see FIG. 5B). Additionally, part of the second column of the second (middle) rectangle has been populated with the segment 3B. The example proceeds to populate the third column of the first rectangle, in the third iteration of the intermediate loop. This again requires two bursts to be read, because the start of the third line does not align with a data burst in the memory 205. In Read 4, the memory reading block 220 reads a burst of data containing a desired segment 4B at the start of Line 3. This data burst also includes several unwanted values X, in segment 4A, which are discarded accordingly. The segment 4B is written to the internal buffer 210 at the top of the third column. Read 5 reads the rest of the first 128 values of Line 3 (in segment 5A), together with extra values E (in segment 5B). Just as for Line 2, the memory reading block 220 writes to the internal buffer 210 all of the values that were read. That is, it increases the number of iterations of the innermost loop beyond 128, in order to write segment 5B in addition to segments 4B and 5A. The segment 5A populates the remainder of the third column in the first (top) rectangle. The segment 5B populates the top of the third column in the second (middle) rectangle. The method proceeds with further iterations of the intermediate loop, until the first part of every line has been read (populating the rest of the dashed top rectangle in the process).

When every column of the first (top) rectangle has been populated, the first iteration of the outermost loop is complete. The method proceeds to the second iteration of the outermost loop, in which the memory reading block 220 proceeds to populate the second (middle) rectangle. In fact, the system detects that the third (bottom) rectangle is smaller than the burst size and, in response, the processing of the second and third rectangles is merged into the second iteration of the outermost loop. In other words, the second iteration of the outermost loop will also be the last iteration, and the number of iterations of the innermost loop is adapted (in particular, increased) to complete the second and third rectangles. The detection of this condition (that the height of the third rectangle is smaller than the burst size) can be handled in advance by software controlling the hardware unit. Alternatively, it can be handled by the hardware unit itself. The first read operation for the second rectangle is denoted "Read N" in FIG. 5A. The memory reading block 220 is now in the first iteration of the intermediate loop (in the second iteration of the outermost loop). Read N reads 310 the second set of 128 values from the first line in the memory 205. This set of values aligns with a single burst of data readable from memory 205, so no special treatment is needed. All 128 values are simply written 320 to the first column of the second rectangle in the internal buffer 210 (in the first 128 iterations of the innermost loop). The iterations of the innermost loop then continue with Read N+1 and the writing of its data values to the buffer in the third (bottom) rectangle. Next, in the second iteration of the intermediate loop, the memory reading block 220 wishes to read the remainder of Line 2, to populate the second column of the second (middle) rectangle and third (bottom) rectangle. However, thanks to the storage of the extra data values E that were read in Read 3, the top of this column has already been populated when processing the first rectangle. Consequently, all that remains is to read the remaining data values for this column, in Read N+2. Just as in the first iteration of the intermediate loop, the iterations of the innermost loop continue until the relevant column of the third rectangle has been populated. There are some additional data values that were read in Read N+2, beyond the end of the second line, which are discarded. (As shown in the diagrams, these actually correspond to the start of the third line.)

Next, in the third iteration of the intermediate loop (still within the second iteration of the outermost loop) the memory reading block 220 wishes to populate the third column of the second (middle) rectangle and third (bottom) rectangle). This was already partly populated by segment 5B, following Read 5. Therefore, the first read operation needed is Read N+3. Once this has been written to the buffer (in a number of iterations of the innermost loop), the memory reading block performs Read N+4 (in a subsequent iteration of the innermost loop). Read N+4 reads a burst containing the final part of Line 3, which is duly written to the third rectangle. This is the end of the third iteration of the intermediate loop. The method continues with further iterations of the intermediate loop, until the relevant part of every line has been read, and both the second (middle) rectangle and the third (bottom) rectangle are full.

It may be noticed, in FIG. 5A, that Read N+1 duplicates Read 2. The desired segment of data in Read N+1 corresponds to the values X that were discarded after Read 2. In principle, the memory reading block 220 could have stored these values in the internal buffer 210 after Read 2. However, in the present example, the MMM is configured only to store additional values that will be needed in the next iteration (next rectangle) and not to store additional values that will be needed in much later iterations. This could be, for example, because the internal buffer is likely to run out of space if it attempts to store data for further, much later iterations. Limiting the storage of additional data in this way has also been found to provide a good compromise between the desire to avoid repeated read operations while also avoiding excessive complexity in the design.

The same applies with respect to Read N+2 and Read 4. The desired segment of data in Read N+2 corresponds to the discarded values X in Read 4. In principle, it may be possible to store these values in the internal buffer 210, following Read 4, rather than discarding them. However, this adds extra complexity. The present example therefore only stores extra data at the end of a burst; it discards "extra" data at the start of a burst. Other examples may choose to store extra data at the start of a burst.

Note also that, after Read N+1, Read N+2 and Read N+4, the memory reading block 220 does not need to write the full burst of data read from the memory to the internal buffer 210. The desired segment is smaller than the burst size, because the third rectangle is not completely filled.

As illustrated in this example, by reducing redundant read operations, the memory reading block 220 can increase the effective bandwidth to the external memory 205. It can help to reduce power consumption and execution time, for a given manipulation of a multidimensional array in memory. Also, by eliminating unnecessary/redundant write operations to the internal buffer 210, the memory reading block 220 can potentially contribute to a further reduction in power consumption and/or execution time.

It will be appreciated that the example is simplified by virtue of the burst size and the rectangular array height being the same value. For example, if the array height were less than the burst size, there would be more instances of extending a read to the end of a burst (i.e. type 'B' operations in the list of alternatives presented earlier).

The storage/processing of additional data in a given iteration, according to the present example, differs from other strategies such as caching of data. Caching data involves providing additional storage. This additional storage and the logic needed to manage it can take up considerable area in an IC design. The use of a cache typically increases latency during read operations, and does not assist with write operations (unlike the present approach, which can be applied equally to reading and writing). Unlike a cache, the approach of the present example places the extra elements in their correct place in the internal buffer 210, according to the current stride and/or data transformation being performed.

Once again, although the example of FIG. 5 above refers to the memory reading block 220, the same principles can also be applied to the memory writing block 230. At the memory writing block 230, by reading extra data values E from the internal buffer 210 in a current iteration, in order to process data in advance for a later iteration, it is possible for the memory writing block to form and write complete data bursts. Writing complete data bursts may be particularly beneficial as it can avoid the need for write masking. Write masking is necessary, in many memory architectures, when writing a partial data burst. The write masking avoids unintended overwriting of data values in the memory (that is, it avoids overwriting of data values other than those of the intended partial data burst). Write masking may be a slow/costly process, in many memory architectures. Therefore, processing the extra data in the current iteration at the memory writing block 230 can particularly improve speed of execution and increase memory bandwidth, as well as saving power, in many implementations.

The size of the internal buffer 210 can be selected according to the architecture and application. In one example, the inventors have found that an internal buffer of 32 KB works well when the memory reads/writes data in 128 B bursts. That is, the internal buffer is 256 times the burst size. It is advantageous that the buffer is twice the square of the burst size (in bytes), as this allows for a double buffer of a region that can be written in one dimension and read in the other.

The MMM architecture of the above example, comprising an internal buffer between a memory reading block and a memory writing block, has been found to be particularly advantageous for manipulating large arrays/tensors of data. Multidimensional arrays that are larger than the size of the internal buffer 210 can be handled by continued looping, reusing (that is, overwriting) the internal buffer repeatedly. The synchronisation between the blocks 220 and 230 ensures that no data is overwritten while it is still needed by the memory writing block 230. In this way, there is no need to limit the size of the multidimensional array to be processed.

The MMM is flexible, in that it can carry out a variety of typically desired manipulations, by reconfiguring the plurality of nested loops in the memory reading block 220 and memory writing block 230. At the same time, it removes burden from the CPU to perform the most common manipulations.

Figure 6:
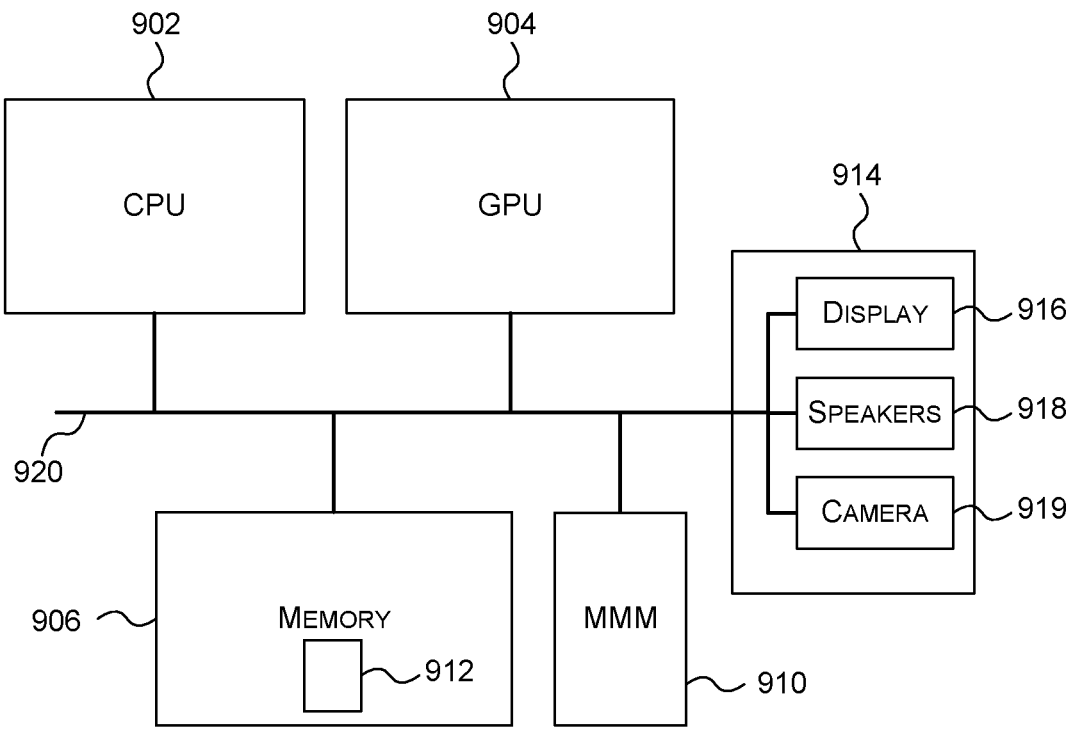
FIG. 6 shows a computer system in which a hardware unit according to an example is implemented.

FIG. 6 shows a computer system in which a hardware unit as described herein may be implemented. The computer system comprises a CPU 902, a GPU 904, a memory 906 and other devices 914, such as a display 916, speakers 918 and a camera 919. A processing block 910 (corresponding to MMM 200) is implemented in the computer system. In other examples, the processing block 910 may be implemented on the CPU 902. The components of the computer system can communicate with each other via a communications bus 920 (corresponding to bus 250). A store 912 (corresponding to external memory 205) is implemented as part of the memory 906.

While FIG. 6 illustrates one implementation of a computer system, it will be understood that a similar block diagram could be drawn for an artificial intelligence accelerator system (alternatively referred to as a neural network accelerator system)—for example, by replacing either the CPU 902 or the GPU 904 with a Neural Network Accelerator (NNA), or by adding the NNA as an additional unit. In such cases, the processing block 910 may be implemented in the NNA.

The hardware unit 200 of FIG. 2 is shown as comprising a number of functional blocks. This is schematic only and is not intended to define a strict division between different logic elements of such entities. Each functional block may be provided in any suitable manner. It is to be understood that intermediate values described herein as being formed by a hardware unit need not be physically generated by the hardware unit at any point and may merely represent logical values which conveniently describe the processing performed by the hardware unit between its input and output.

The hardware units described herein may be embodied in hardware on an integrated circuit. The hardware units described herein may be configured to perform any of the methods described herein. Generally, any of the functions, methods, techniques or components described above can be implemented in software, firmware, hardware (e.g., fixed logic circuitry), or any combination thereof. The terms "module," "functionality," "component", "element", "unit", "block" and "logic" may be used herein to generally represent software, firmware, hardware, or any combination thereof. In the case of a software implementation, the module, functionality, component, element, unit, block or logic represents program code that performs the specified tasks when executed on a processor. The algorithms and methods described herein could be performed by one or more processors executing code that causes the processor(s) to perform the algorithms/methods. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The terms computer program code and computer readable instructions as used herein refer to any kind of executable code for processors, including code expressed in a machine language, an interpreted language or a scripting language. Executable code includes binary code, machine code, byte-code, code defining an integrated circuit (such as a hardware description language or netlist), and code expressed in a programming language code such as C, Java or OpenCL. Executable code may be, for example, any kind of software, firmware, script, module or library which, when suitably executed, processed, interpreted, compiled, executed at a virtual machine or other software environment, cause a processor of the computer system at which the executable code is supported to perform the tasks specified by the code.

A processor, computer, or computer system may be any kind of device, machine or dedicated circuit, or collection or portion thereof, with processing capability such that it can execute instructions. A processor may be any kind of general purpose or dedicated processor, such as a CPU, GPU, NNA, System-on-chip, state machine, media processor, an application-specific integrated circuit (ASIC), a programmable logic array, a field-programmable gate array (FPGA), or the like. A computer or computer system may comprise one or more processors.

It is also intended to encompass software which defines a configuration of hardware as described herein, such as HDL (hardware description language) software, as is used for designing integrated circuits, or for configuring programmable chips, to carry out desired functions. That is, there may be provided a computer readable storage medium having encoded thereon computer readable program code in the form of an integrated circuit definition dataset that when processed (i.e. run) in an integrated circuit manufacturing system configures the system to manufacture a hardware unit configured to perform any of the methods described herein, or to manufacture a hardware unit comprising any apparatus described herein. An integrated circuit definition dataset may be, for example, an integrated circuit description.

Therefore, there may be provided a method of manufacturing, at an integrated circuit manufacturing system, a hardware unit as described herein. Furthermore, there may be provided an integrated circuit definition dataset that, when processed in an integrated circuit manufacturing system, causes the method of manufacturing a hardware unit to be performed.

An integrated circuit definition dataset may be in the form of computer code, for example as a netlist, code for configuring a programmable chip, as a hardware description language defining hardware suitable for manufacture in an integrated circuit at any level, including as register transfer level (RTL) code, as high-level circuit representations such as Verilog or VHDL, and as low-level circuit representations such as OASIS® and GDSII. Higher level representations which logically define hardware suitable for manufacture in an integrated circuit (such as RTL) may be processed at a computer system configured for generating a manufacturing definition of an integrated circuit in the context of a software environment comprising definitions of circuit elements and rules for combining those elements in order to generate the manufacturing definition of an integrated circuit so defined by the representation. As is typically the case with software executing at a computer system so as to define a machine, one or more intermediate user steps (e.g. providing commands, variables etc.) may be required in order for a computer system configured for generating a manufacturing definition of an integrated circuit to execute code defining an integrated circuit so as to generate the manufacturing definition of that integrated circuit.

An example of processing an integrated circuit definition dataset at an integrated circuit manufacturing system so as to configure the system to manufacture a hardware unit will now be described with respect to FIG. 7.

Figure 7:
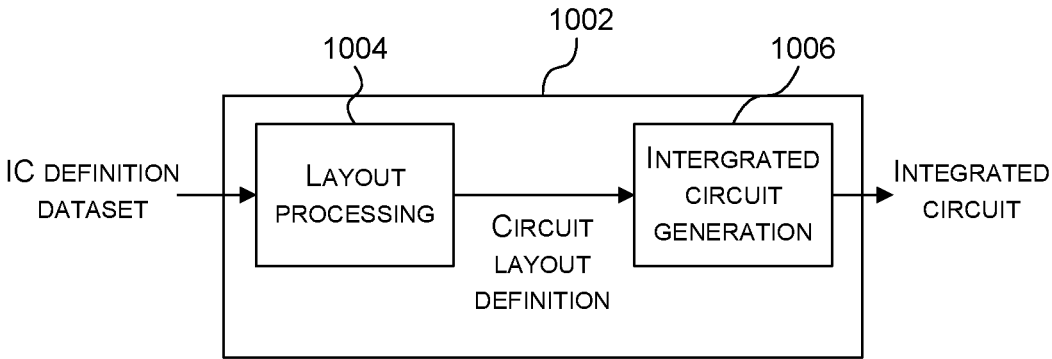
FIG. 7 shows an integrated circuit manufacturing system for generating an integrated circuit embodying a hardware unit according to an example.

FIG. 7 shows an example of an integrated circuit (IC) manufacturing system 1002 which is configured to manufacture a hardware unit as described in any of the examples herein. In particular, the IC manufacturing system 1002 comprises a layout processing system 1004 and an integrated circuit generation system 1006. The IC manufacturing system 1002 is configured to receive an IC definition dataset (e.g. defining a hardware unit as described in any of the examples herein), process the IC definition dataset, and generate an IC according to the IC definition dataset (e.g. which embodies a hardware unit as described in any of the examples herein). The processing of the IC definition dataset configures the IC manufacturing system 1002 to manufacture an integrated circuit embodying a hardware unit as described in any of the examples herein.

The layout processing system 1004 is configured to receive and process the IC definition dataset to determine a circuit layout. Methods of determining a circuit layout from an IC definition dataset are known in the art, and for example may involve synthesising RTL code to determine a gate level representation of a circuit to be generated, e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimise the circuit layout. When the layout processing system 1004 has determined the circuit layout it may output a circuit layout definition to the IC generation system 1006. A circuit layout definition may be, for example, a circuit layout description.

The IC generation system 1006 generates an IC according to the circuit layout definition, as is known in the art. For example, the IC generation system 1006 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 1006 may be in the form of computer-readable code which the IC generation system 1006 can use to form a suitable mask for use in generating an IC.

The different processes performed by the IC manufacturing system 1002 may be implemented all in one location, e.g. by one party. Alternatively, the IC manufacturing system 1002 may be a distributed system such that some of the processes may be performed at different locations, and may be performed by different parties. For example, some of the stages of: (i) synthesising RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In other examples, processing of the integrated circuit definition dataset at an integrated circuit manufacturing system may configure the system to manufacture a hardware unit without the IC definition dataset being processed so as to determine a circuit layout. For instance, an integrated circuit definition dataset may define the configuration of a reconfigurable processor, such as an FPGA, and the processing of that dataset may configure an IC manufacturing system to generate a reconfigurable processor having that defined configuration (e.g. by loading configuration data to the FPGA).

In some embodiments, an integrated circuit manufacturing definition dataset, when processed in an integrated circuit manufacturing system, may cause an integrated circuit manufacturing system to generate a device as described herein. For example, the configuration of an integrated circuit manufacturing system in the manner described above with respect to FIG. 7 by an integrated circuit manufacturing definition dataset may cause a device as described herein to be manufactured.

In some examples, an integrated circuit definition dataset could include software which runs on hardware defined at the dataset or in combination with hardware defined at the dataset. In the example shown in FIG. 7, the IC generation system may further be configured by an integrated circuit definition dataset to, on manufacturing an integrated circuit, load firmware onto that integrated circuit in accordance with program code defined at the integrated circuit definition dataset or otherwise provide program code with the integrated circuit for use with the integrated circuit.

The implementation of concepts set forth in this application in devices, apparatus, modules, and/or systems (as well as in methods implemented herein) may give rise to performance improvements when compared with known implementations. The performance improvements may include one or more of increased computational performance, reduced latency, increased throughput, and/or reduced power consumption. During manufacture of such devices, apparatus, modules, and systems (e.g. in integrated circuits) performance improvements can be traded-off against the physical implementation, thereby improving the method of manufacture. For example, a performance improvement may be traded against layout area, thereby matching the performance of a known implementation but using less silicon. This may be done, for example, by reusing functional blocks in a serialised fashion or sharing functional blocks between elements of the devices, apparatus, modules and/or systems. Conversely, concepts set forth in this application that give rise to improvements in the physical implementation of the devices, apparatus, modules, and systems (such as reduced silicon area) may be traded for improved performance. This may be done, for example, by manufacturing multiple instances of a module within a predefined area budget.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

What is claimed is:

1. A hardware unit for manipulating data stored in a memory, the hardware unit comprising:
    an internal buffer;
    a memory reading block, configured to read the data from the memory and write the data to the internal buffer;
    a memory writing block, configured to read the data from the internal buffer and write the data to the memory; and
    a control channel between the memory reading block and the memory writing block, wherein the memory reading block and the memory writing block are configured to communicate via the control channel to maintain synchronisation between them when writing the data to the internal buffer and reading the data from the internal buffer, respectively;
    wherein the data comprises a multidimensional array comprising a plurality of data elements, wherein at least one of the memory reading block and the memory writing block is configured to traverse the multidimensional array using a plurality of nested loops, each loop having associated with it a corresponding stride between data elements of the multidimensional array.

2. The hardware unit of claim 1, wherein at least one loop of the plurality of nested loops is configured to iterate a different number of times depending on at least one of:
    (a) a loop index of at least one other loop of the plurality of nested loops; and
    (b) a software configurable flag.

3. The hardware unit of claim 1, wherein each loop of the plurality of loops is configured to perform a variable number of iterations, the variable number being selected at runtime from a group comprising:
    a first number of iterations to be performed when one or more outer loops of the plurality of nested loops are not in their end iteration; and
    a second number of iterations to be performed when the one or more outer loops of the plurality of nested loops are in their end iteration.

4. The hardware unit of claim 1,
    wherein the multidimensional array is stored in the memory in a storage format having storage units of a predetermined third size, wherein one or more dimensions of the multidimensional array are not an integer multiple of the third size.

5. The hardware unit of claim 4, wherein at least one of the memory reading block and the memory writing block is configured to traverse the multidimensional array using a plurality of nested loops, each loop having associated with it a corresponding stride between data elements of the multidimensional array,
    wherein said at least one block is configured to select, for at least one loop of the plurality of nested loops, a different number of iterations when one or more outer loops are in their end iteration, as compared with the number of iterations of said at least one loop when the one or more outer loops are not in their end iteration.

6. The hardware unit of claim 1, wherein the synchronisation between the memory reading block and memory writing block ensures that no data is overwritten in the internal buffer by the memory reading block while it is still needed by the memory writing block, and that data is not read from the internal buffer by the memory writing block until it has been validly written to the internal buffer by the memory reading block.

7. A hardware unit for manipulating data stored in a memory, the hardware unit comprising:

an internal buffer;

a memory reading block, configured to read the data from the memory and write the data to the internal buffer;

a memory writing block, configured to read the data from the internal buffer and write the data to the memory; and a control channel between the memory reading block and the memory writing block, wherein the memory reading block and the memory writing block are configured to communicate via the control channel to maintain synchronisation between them when writing the data to the internal buffer and reading the data from the internal buffer, respectively, wherein each of the memory reading block and the memory writing block has a respective synchronisation counter, the blocks being configured to communicate their synchronisation counters with each other via the control channel, wherein the hardware unit is configured to maintain synchronisation between the blocks by comparing the synchronisation counters.

8. The hardware unit of claim 7, wherein the data comprises a multidimensional array comprising a plurality of data elements, wherein each of the memory reading block and the memory writing block is configured to traverse the multidimensional array using a respective plurality of nested loops, each loop having associated with it a corresponding stride between data elements of the multidimensional array, wherein the synchronisation counter of the memory reading block is associated with a first loop of its plurality of loops and the synchronisation counter of the memory writing block is associated with a second loop of its plurality of loops.

9. The hardware unit of claim 7, wherein the operation of one of the blocks is paused if the difference between the respective synchronisation counters exceeds a predetermined threshold.

10. A hardware-implemented method of manipulating data stored in a memory, the data comprising a multidimensional array comprising a plurality of data elements, the method comprising:

(i) reading the data from the memory and writing the data to the internal buffer using a memory reading block; and (ii) reading the data from the internal buffer and writing the data to the memory using a memory writing block, wherein at least one of the steps (i) and (ii) is performed using a plurality of nested loops, each loop having associated with it a corresponding stride between data elements of the multidimensional array, wherein at least one loop of the plurality of nested loops is configured to iterate a different number of times depending on a loop index of at least one other loop of the plurality of nested loops, and wherein the memory reading block and the memory writing block are configured to communicate via a control channel to maintain synchronisation between step (i) and step (ii);

wherein each loop of the plurality of loops is configured to perform a variable number of iterations, the variable number being selected at runtime from a group comprising:

a first number of iterations to be performed when one or more outer loops of the plurality of nested loops are in their first iteration; and a second number of iterations to be performed when the one or more outer loops of the plurality of nested loops are in their end iteration.

11. The method of claim 10, wherein at least one loop of the plurality of nested loops is further configured to iterate a different number of times depending on a software configurable flag.

12. The method of claim 10, further comprising:

maintaining a first synchronisation counter associated with a first loop among the plurality of loops performing step (i), wherein the first synchronisation counter is incremented with each iteration of the first loop;

maintaining a second synchronisation counter associated with a second loop among the plurality of loops performing step (ii), wherein the second synchronisation counter is incremented with each iteration of the second loop;

comparing a current value of the first synchronisation counter with a current value of the second synchronisation counter; and controlling the progress of step (i) and or step (ii) based on a result of the comparison.

13. The method of claim 12, wherein controlling the progress of step (i) and/or step (ii) based on a result of the comparison comprises one or more of:

pausing step (i) if the first synchronisation counter exceeds the second synchronisation counter by more than a predetermined first threshold; and pausing step (ii) if the second synchronisation counter exceeds the first synchronisation counter by more than a predetermined second threshold.

14. A method of manufacturing, using an integrated circuit manufacturing system, the hardware unit as set forth in claim 1, the method comprising:

processing, using a layout processing system, a computer readable dataset description of the hardware unit so as to generate a circuit layout description of an integrated circuit embodying the hardware unit or neural network accelerator system; and manufacturing, using an integrated circuit generation system, the hardware unit according to the circuit layout description.

15. A non-transitory computer readable storage medium having stored thereon computer readable code configured to cause the method as set forth in claim 10 to be performed when the code is run on at least one processor.

16. A non-transitory computer readable storage medium having stored thereon a computer readable data description of a hardware unit as set forth in claim 1 that, when processed in an integrated circuit manufacturing system, causes the integrated circuit manufacturing system to manufacture an integrated circuit embodying the hardware unit or neural network accelerator system.

17. An integrated circuit manufacturing system comprising:

a non-transitory computer readable storage medium having stored thereon a computer readable dataset description of a hardware unit as set forth in claim 1;

a layout processing system configured to process the computer readable description so as to generate a circuit layout description of an integrated circuit embodying the hardware unit; and an integrated circuit generation system configured to manufacture the hardware unit according to the circuit layout description.

* * * * *